(12) United States Patent
Xuan et al.

(10) Patent No.: US 8,451,235 B2
(45) Date of Patent: May 28, 2013

(54) OPTICAL TOUCH PANEL

(75) Inventors: Hawaii W Y Xuan, Taipei (TW);
Edward Y S Lee, Taipei (TW); Kenji C C Chen, Taipei (TW); Robert D. Parsons, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 12/341,377

(22) Filed: Dec. 22, 2008

(65) Prior Publication Data

US 2009/0167724 A1    Jul. 2, 2009

(30) Foreign Application Priority Data

Dec. 28, 2007    (TW) ................................ 96151662 A

(51) Int. Cl.
*G06F 3/042*    (2006.01)
(52) U.S. Cl.
USPC ............................ 345/173; 345/174; 345/175
(58) Field of Classification Search
None
See application file for complete search history.

(56) References Cited

U.S. PATENT DOCUMENTS

| 4,811,004 A | 3/1989 | Person et al. |
| 4,837,430 A | 6/1989 | Hasegawa |
| 4,888,479 A * | 12/1989 | Tamaru ........................... 250/221 |
| 4,933,544 A * | 6/1990 | Tamaru ........................... 345/175 |
| 5,414,413 A * | 5/1995 | Tamaru et al. ................. 345/175 |
| 6,429,857 B1 * | 8/2002 | Masters et al. ................. 345/175 |
| 6,597,508 B2 * | 7/2003 | Seino et al. .................... 345/173 |
| 6,836,367 B2 | 12/2004 | Seino et al. |
| 2002/0118461 A1 * | 8/2002 | Seino et al. .................... 359/627 |
| 2005/0243070 A1 | 11/2005 | Ung et al. |

FOREIGN PATENT DOCUMENTS

JP             04209428 A  *  7/1992

* cited by examiner

*Primary Examiner* — Van Chow
(74) *Attorney, Agent, or Firm* — The Steadman Law Firm PLLC; Thomas E. Tyson

(57) ABSTRACT

An optical touch panel is provided, which may comprise a rectangular position-detecting surface; a plurality of light-emitting element pairs configured for emitting a plurality of light beams; two reflectors configured for reflecting the plurality of light beams emitted by the plurality of light-emitting element pairs; and a plurality of light-receiving element pairs configured for receiving the plurality of light beams emitted by the plurality of light-emitting element pairs. The optical touch panel further may comprise a control circuit configured for causing the light-emitting element pairs to emit the plurality of light beams in a predetermined order to scan the position-detecting surface, and further configured for causing the plurality of light-receiving element pairs to receive the plurality of light beams, thereby forming optical paths on the position-detecting surface in a grid pattern. The control circuit further may be configured for determining the coordinates of an object positioned on the position-detecting surface.

16 Claims, 4 Drawing Sheets

OPTICAL TOUCH PANEL

RELATED APPLICATION

This application claims priority under 35 U.S.C. §119 to Taiwanese Patent Application No. 96151662 filed Dec. 28, 2007, the entire text of which is specifically incorporated by reference herein.

FIELD OF THE INVENTION

The various embodiments described herein relate to an improved optical touch panel, and, more particularly, to an infrared (IR) touch panel.

BACKGROUND OF THE INVENTION

A variety of touch panel technologies are presently in existence, including resistive technology, capacitive technology, surface acoustical wave (SAW) technology, infrared (IR) technology, etc.

In the case of IR touch panel technology, infrared emitter/collector pairs are used to project an invisible grid of light a small distance over the surface of the panel. When a beam is interrupted, the absence of the signal at the collector is detected and converted to touch coordinates (e.g., X/Y rectangular coordinates). Since the method of determining a touch is optical instead of electrical or mechanical, IR touch panels are not as sensitive to damage as some technologies, such as resistive and capacitive technologies.

The structure of a conventional optical touch panel is disclosed in U.S. Pat. No. 6,597,508, which is incorporated herein by reference. FIG. 1 depicts the construction of a conventional optical touch panel 101 as shown in the patent. The optical touch panel 101 comprises a plurality of light-emitting elements (e.g., LEDs) 110 arranged along two adjacent sides of a rectangular position-detecting surface 150 and a plurality of light-receiving elements (e.g., photo transistors) 130 arranged along the other two sides of the rectangular position-detecting surface 150 such that the light-emitting elements 110 are positioned opposite to the respective light-receiving elements 130 and the position-detecting surface 150 is positioned between the light-emitting elements 110 and the light-receiving elements 130.

A control block 140 causes the light-emitting elements 110 to emit light beams sequentially from left to right and from top to bottom, and causes the light-receiving elements 130 to receive light beams from the respective light-emitting elements 110 positioned opposite thereto. The light beams of the light-emitting elements 110 are sequentially scanned across the position-detecting surface 150 such that optical paths are formed on the position-detecting surface 150 in a grid pattern.

The touch coordinates can be determined in accordance with which light-emitting element 110 emits a light beam and which light-receiving element 130 senses such light beam during a scan cycle. When an object (e.g., a pointing device such as a touch pen or a finger) 170 is positioned on the position-detecting surface 150 as shown in FIG. 1, the object 170 blocks some optical paths to thereby hinder light beams from the corresponding light-emitting elements 110 from reaching the corresponding light-receiving elements 130 positioned opposite to the light-emitting elements 110. As a result, the control block 140 determines the position of the object 170 in terms of two-dimensional coordinates (e.g., X/Y rectangular coordinates) based on information of received light beams from the light-receiving elements 130. If the object 170 also blocks the infrared light of adjacent rows and columns of the grid pattern, the intended center position can be obtained by averaging the coordinate information received by the relevant computing device.

In the optical touch panel 101, however, the light-emitting elements 110 and the light-receiving elements 130 must be arranged along the four sides of the position-detecting surface 150, and hence it takes a significant amount of time to establish wire connections among the elements. Thus, the optical touch panel 101 is complicated, its assembly difficult, and it is difficult to reduce its size.

FIG. 2 depicts the construction of another conventional optical touch panel 201 as shown in U.S. Pat. No. 6,597,508 that attempts to resolve the aforementioned issue.

The optical touch panel 201 comprises light-emitting elements 210, two reflectors 220 (e.g., mirrors) for reflecting lights from the light-emitting elements 210, and light-receiving elements 230 for receiving the reflected lights from the reflectors 220.

The light-emitting elements 210 and the light-receiving elements 230 are alternately arranged along two adjacent sides of a rectangular position-detecting surface 250, and the reflectors 220 are arranged along the other two adjacent sides of the rectangular position-detecting surface 250.

When an object 270 lies in a position shown in FIG. 2, the object 270 blocks some optical paths to thereby hinder lights from the reflectors 220 from reaching the light-receiving elements 230 opposed to the object 270. As a result, a control block 240 determines the position of the object 270 based on information of received lights from the light-receiving elements 230.

The optical touch panel 201 thus may have simpler wiring, a simpler assembly, and a smaller size than the optical touch panel 101. However, the optical touch panel 201 uses a pair of alternately arranged elements (i.e., a light-emitting element 210 and a light-receiving element 230) per one optical path, and thus the resolution (i.e., accuracy) of the touch panel will be affected. For example, the four positions A, B, C, and D in FIG. 2 have the same X/Y coordinates, and thus resolution will be affected.

Additionally, the aforementioned optical touch panels require a light gate for each light-receiving element in order to prevent erroneous light detection from being caused by sunlight. Therefore, a solution is needed that is able to increase the resolution while preventing erroneous detection from sunlight.

SUMMARY OF THE INVENTION

The various embodiments described herein provide an optical touch panel having a construction which may have increased resolution (i.e., accuracy). Light-emitting elements may be arranged along one side of a position-detecting surface in a lengthwise direction, while light-receiving elements may be arranged along another side positioned opposite to the light-emitting elements in the lengthwise direction. Thus, sunlight will not affect detection of the position of an object positioned on the position-detecting surface. Accordingly, the light gate design for each light-receiving element may be saved.

More specifically, according to an exemplary embodiment, the optical touch panel may comprise a rectangular position-detecting surface with a specified length and a specified width. Moreover, the optical touch panel may comprise a plurality of light-emitting element pairs configured for emitting a plurality of light beams. The plurality of light-emitting element pairs may be arranged in pair at various points along a first side of the position-detecting surface in a lengthwise direction. A first light-emitting element may be arranged at the left side of each light-emitting element pair at an angle 180−θ with reference to the first side, and a second light-emitting element may be arranged at the right side of each light-emitting element pair at an angle θ with reference to the first side.

Additionally, the optical touch panel may comprise two reflectors (e.g., mirrors) arranged along two opposing sides of the position-detecting surface in a widthwise direction. The reflectors may be configured for reflecting the plurality of light beams emitted by the plurality of light-emitting element pairs.

Furthermore, the optical touch panel may comprise a plurality of light-receiving element pairs configured for receiving the plurality of light beams emitted by the plurality of light-emitting element pairs. The received light beams may be reflected by the reflectors or may be directly emitted by the plurality of light-emitting element pairs without reflection. The plurality of light-receiving element pairs may be arranged in pair at various points along a second side of the position-detecting surface opposite to the first side in the lengthwise direction. A first light-receiving element may be arranged at the left side of each light-receiving element pair at an angle θ−180 with reference to the second side, and a second light-receiving element may be arranged at the right side of each light-receiving element pair at an angle −θ with reference to the second side.

The angle θ with respect to the light-emitting elements and the light-receiving elements may be greater than an angle β. The angle β may be the angle of the diagonal line of the position-detecting surface with reference to the x-axis of the position-detecting surface.

The optical touch panel further may comprise a control circuit. The control circuit may be configured for causing the plurality of light-emitting element pairs to emit the plurality of light beams in a predetermined order for the purpose of scanning the position-detecting surface. The control circuit further may be configured for causing the plurality of light-receiving element pairs to receive the plurality of light beams, thereby forming optical paths on the position-detecting surface in a grid pattern.

When an object is positioned on the position-detecting surface of the optical touch panel, the object blocks at least a portion of the plurality of light beams, thereby hindering the portion of the plurality of light beams from reaching at least one of the first or second light-receiving elements of at least one of the plurality of light-receiving element pairs. The optical touch panel may be adapted for detecting such object. More specifically, the control circuit may be further configured to determine the X/Y rectangular coordinates of such object by analyzing which light-receiving elements fail to receive light beams.

In order to determine the rectangular coordinates (A, B) of the object positioned on the position-detecting surface, the control circuit may be configured for dividing the position-detecting surface into four regions I, II, III, and IV. The four regions I, II, III, and IV may be based on whether each of two light-receiving elements not receiving a light beam is a first light-receiving element or a second light-receiving element of one of the plurality of light-receiving element pairs. Moreover, the control circuit may be configured to compute the X/Y rectangular coordinates (A, B) of the object on the position-detecting surface via the following analysis:

If the two light-receiving elements that do not receive a light beam during a scan cycle are both first light-receiving elements, then the object is positioned within the region I of the position-detecting surface. The equation to determine the X/Y rectangular coordinates (A, B) when the object is positioned within the region I is the following:

$$(A, B) = \left(\left|\frac{n-m}{2}\right|, W - \frac{n+m}{2}\right)$$

If the two light-receiving elements that do not receive a light beam during a scan cycle are both second light-receiving elements, then the object is positioned within the region II of the position-detecting surface. The equation to determine the X/Y rectangular coordinates (A, B) when the object is positioned within the region II is the following:

$$(A, B) = \left(L - \left|\frac{n-m}{2}\right|, (W - L) + \frac{n+m}{2}\right)$$

If the light-receiving element at a left portion of the second side of the position-detecting surface that does not receive a light beam during a scan cycle is a first light-receiving element, and the light-receiving element at a right portion of the second side of the position-detecting surface that does not receive a light beam is a second light-receiving element, then the object is positioned within the region III of the position-detecting surface. The equation to determine the X/Y rectangular coordinates (A, B) when the object is positioned within the region III is the following:

$$(A, B) = \left(L - \frac{n+m}{2}, (W - L) + \left|\frac{n-m}{2}\right|\right)$$

If the light-receiving element at a left portion of the second side of the position-detecting surface that does not receive a light beam during a scan cycle is a second light-receiving element, and the light-receiving element at a right portion of the second side of the position-detecting surface that does not receive a light beam is a first light-receiving element, then the object is positioned within the region IV of the position-detecting surface. The equation to determine the X/Y rectangular coordinates (A, B) when the object is positioned within the region IV is the following:

$$(A, B) = \left(\frac{n+m}{2}, W - \left|\frac{n-m}{2}\right|\right)$$

In the above equations, '(A, B)' corresponds to the X/Y rectangular coordinates of the object positioned on the rectangular position-detecting surface, and 'm' and 'n' respectively correspond to the distances of the two light-receiving elements not receiving a light beam from the left edge of the second side of the position-detecting surface.

The angle θ may be 45 degrees, in which case the angle between the first light-emitting element and the second light-emitting element of each light-emitting element pair is 90 degrees, and the angle between the first light-receiving element and the second light-receiving element of each light-receiving element pair is 90 degrees.

BRIEF DESCRIPTION OF THE DRAWINGS

Various exemplary embodiments will be described in detail, with reference to the following figures, wherein.

DETAILED DESCRIPTION

Figure 1:
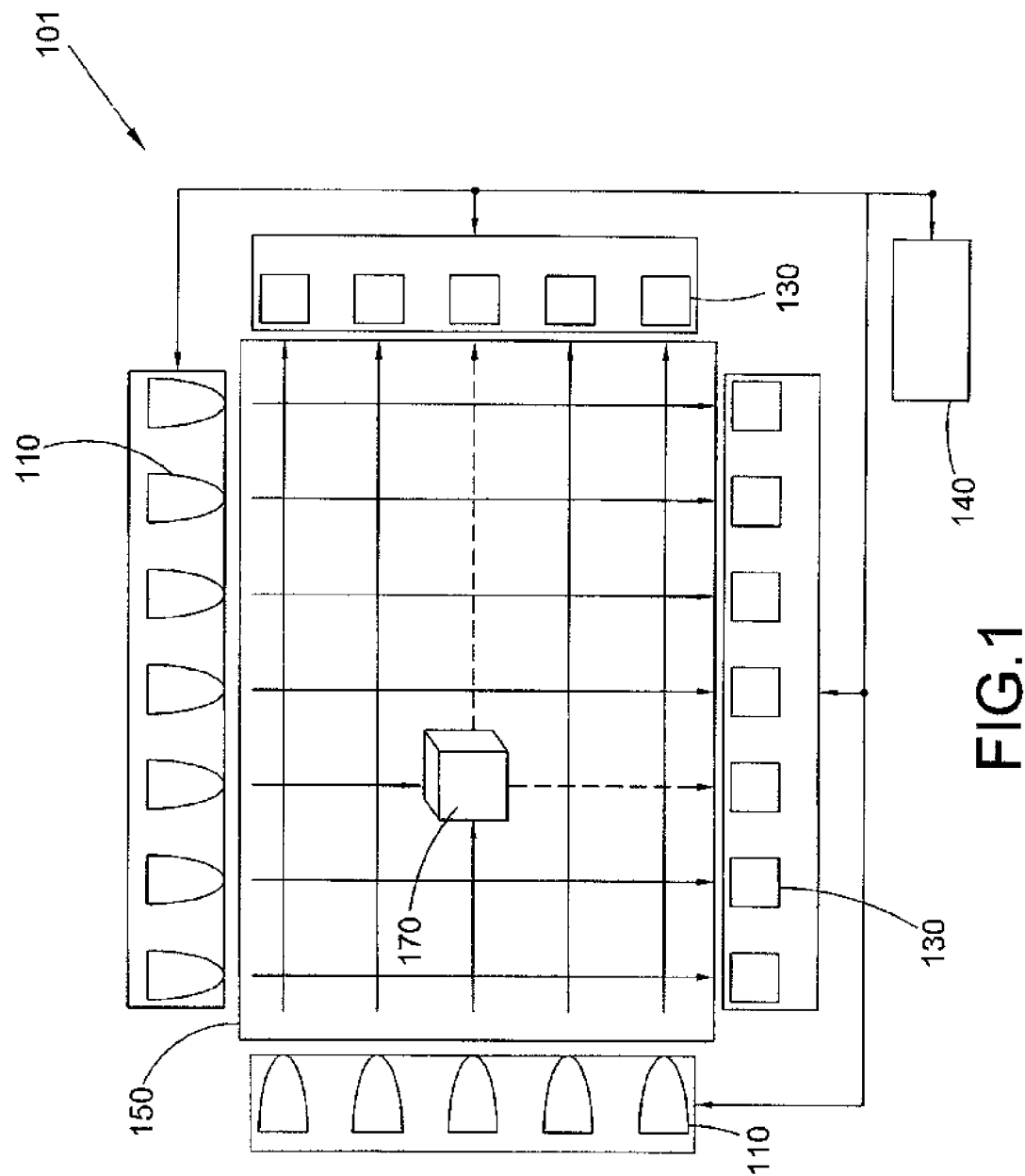
FIG. 1 is a block diagram depicting the construction of a conventional optical touch panel according to the prior art.

The following describes various exemplary embodiments. The disclosed embodiments are only for illustration. Thus, it will be understood by those skilled in the art that there are many modifications that may be made to the various embodiments described herein without departing from the spirit and scope of the disclosure. Throughout the drawings, similar features are identified by similar reference numerals.

Figure 3:
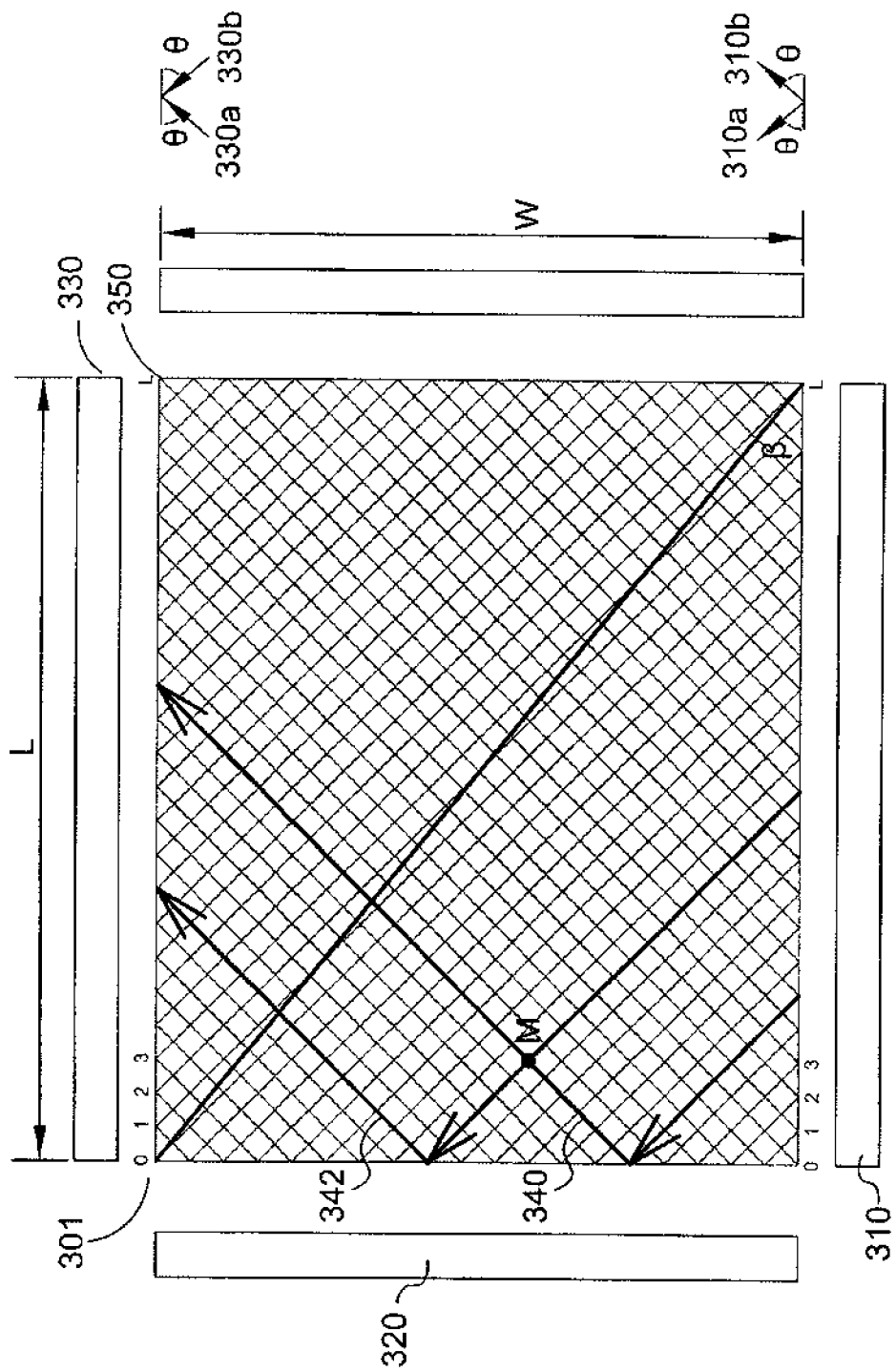
FIG. 3 is a schematic diagram of the construction of an optical touch panel in accordance with an exemplary embodiment.

With reference to FIG. 3, a schematic diagram of the construction of an optical touch panel 301 is provided. The optical touch panel 301 may comprise a rectangular position-detecting surface 350 with a specified length L and a specified width W (wherein L may be greater than or equal to W), a plurality of light-emitting element pairs (310a, 310b), two reflectors (e.g., mirrors) 320, and a plurality of light-receiving element pairs (330a, 330b). Each light-receiving element may be configured for receiving light beams reflected by the reflectors 320 or light beams directly emitted by the plurality of light-emitting element pairs without reflection.

The plurality of light-emitting element pairs (310a, 310b) may comprise light emitting diodes (LEDs). The plurality of light-receiving element pairs (330a, 330b) may comprise photo transistors.

The plurality of light-emitting element pairs (310a, 310b) may be arranged in pair at various points along a first side 310 of the rectangular position-detecting surface 350 in a lengthwise (L) direction. More specifically, there may be various points (e.g., point 0, point 1 ... point L) along the first side 310 at which the plurality of light-emitting element pairs (310a, 310b) may be arranged. At each of these various points, other than the starting and the ending points (i.e., point 0 and point L, which are at the edges of the first side 310), a first light-emitting element (310a) and a second light-emitting element (310b) may be arranged in pair [note that at the starting point (i.e., point 0), a second light-emitting element (310b) may be arranged, while at the ending point (i.e., point L), a first light-emitting element (310a) may be arranged]. The first light-emitting element (310a) may be arranged at the left side of each light-emitting element pair (310a, 310b) at an angle 180−θ with reference to the first side 310, and the second light-emitting element (310b) may be arranged at the right side of each light-emitting element pair (310a, 310b) at an angle θ with reference to the first side 310. The angle θ with reference to the first side 310 may be greater than an angle β, which may be the angle of the diagonal line of the rectangular position-detecting surface 350 with reference to the x-axis of the rectangular position-detecting surface 350. According to an exemplary embodiment, the angle θ may be 45 degrees, in which case the angle between the first light-emitting element (310a) and the second light-emitting element (310b) of each light-emitting element pair (310a, 310b) is 90 degrees.

Similarly, the plurality of light-receiving element pairs (330a, 330b) may be arranged in pair at various points along a second side 330 opposite to the first side 310 of the rectangular position-detecting surface 350 in the lengthwise (L) direction. More specifically, there may be various points (e.g., point 0, point 1 ... point L) along the second side 330 at which the plurality of light-receiving element pairs (330a, 330b) may be arranged. At each of these various points, other than the starting and the ending points (i.e., point 0 and point L, which are at the edges of the second side 330), a first light-receiving element (330a) and a second light-receiving element (330b) may be arranged in pair [note that at the starting point (i.e., point 0), a second light-receiving element (330b) may be arranged, while at the ending point (i.e., point L), a first light-receiving element (330a) may be arranged]. The first light-receiving element (330a) may be arranged at the left side of each light-receiving element pair (330a, 330b) at an angle θ−180 with reference to second side 330, and the second light-receiving element (330b) may be arranged at the right side of each light-receiving element pair (330a, 330b) at an angle −θ with reference to the second side 330. The angle θ with reference to the second side 330 may be greater than the angle β. According to an exemplary embodiment, the angle θ may be 45 degrees, in which case the angle between the first light-receiving element (330a) and the second light-receiving element (330b) of each light-receiving element pair (330a, 330b) is 90 degrees.

The two reflectors 320 may be arranged along two opposing sides of the rectangular position-detecting surface 350 in a widthwise (W) direction for reflecting light beams emitted by the plurality of light-emitting element pairs (310a, 310b).

In accordance with the exemplary embodiment as shown in FIG. 3, given L=23 and W=19, each of the second light-receiving elements (330b) at points 0 through 4 may receive light beams emitted from the first light-emitting elements (310a) at points 19 through 23 respectively. Moreover, each of the first light-receiving elements (330a) at points 19 through 23 may receive light beams emitted from the second light-emitting elements (310b) at points 0 through 4 respectively. It is important to note that such transmissions of light beams are not explicitly illustrated in FIG. 3 but nevertheless are possible with respect to the optical touch panel 301 as depicted in FIG. 3.

A control circuit (not shown) may be configured for causing the light-emitting element pairs (310a, 310b) to emit light beams in a predetermined order for the purpose of scanning the position-detecting surface 350. For instance, the light-emitting element pairs (310a, 310b) may emit light beams one-by-one in a sequential order from left to right, or a plurality of alternate light-emitting element pairs may simultaneously emit light beams at a given time. Moreover, the control circuit may be configured for causing the plurality of light-receiving element pairs (330a, 330b) to receive the light beams emitted from the plurality of light-emitting element pairs (310a, 310b). Accordingly, optical paths may be formed on the position-detecting surface 350 in a grid pattern as shown in FIG. 3.

When an object M (e.g., a pointing device such as a touch pin or a finger) is positioned on the position-detecting surface 350 as shown in FIG. 3, the object M blocks a light beam 340 emitted by one of the first light-emitting elements (310a) and reflected by one of the reflectors 320. Moreover, the object M blocks a light beam 342 directly emitted by another of the first light-emitting elements (310a). Due to the blockage of the light beam 340 and the light beam 342, two of the light-receiving elements do not receive these light beams. Accordingly, the control circuit may be configured to determine the X/Y rectangular coordinates of the object M based on which light-receiving elements fail to receive a light beam during a scan cycle due to blockage of the light beam 340 and the light beam 342. If the object M blocks more than two light beams, the coordinates of the intended center position of the object M may be determined by averaging the detected coordinate information. Such averaging may be completed by the control circuit or by another device operatively coupled to the optical touch panel 301.

Figure 4:
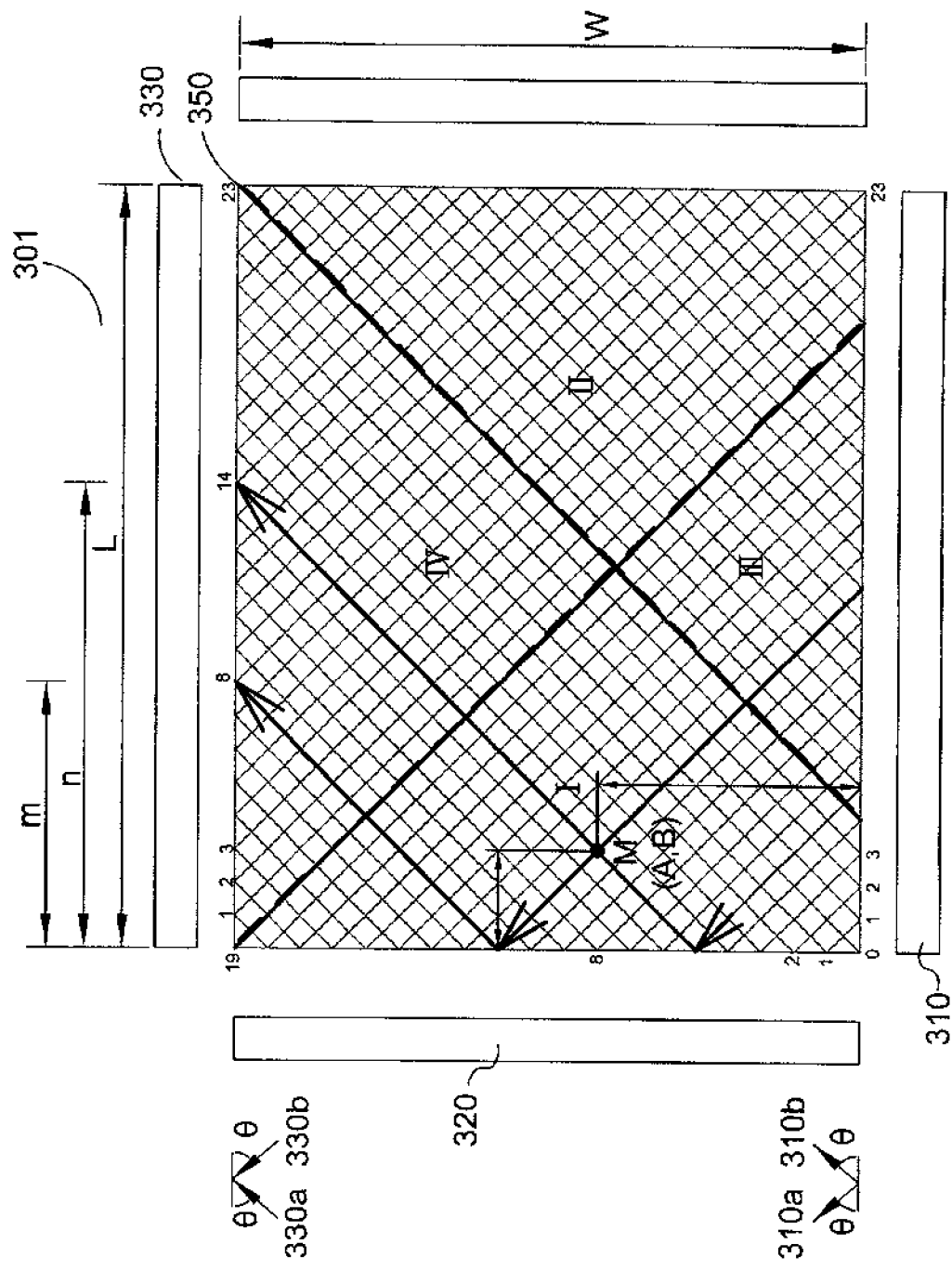
FIG. 4 is a schematic diagram of divided regions to determine X/Y rectangular coordinates of an object positioned on the optical touch panel illustrated in FIG. 3 in accordance with an exemplary embodiment.

In accordance with an exemplary embodiment with reference to FIG. 4, in order to determine the X/Y rectangular coordinates of the object M positioned on the position-detecting surface 350 in the event that the object M blocks two light beams, the control circuit may be configured for dividing the position-detecting surface 350 into four regions I, II, III, and IV. These four regions I, II, III, and IV may be based on whether each of the two light-receiving elements not receiving a light beam is a first light-receiving element or a second light-receiving element of one of the plurality of light-receiving element pairs.

FIG. 4 depicts according to an exemplary embodiment a schematic diagram of the four regions created for the purpose of determining the X/Y rectangular coordinates (A, B) of the object M positioned on the rectangular position-detecting surface 350 of the optical touch panel 301 illustrated in FIG. 3. 'A' and 'B' are respectively the X and Y rectangular coordinates of the object M.

The control circuit may be configured to compute the X/Y rectangular coordinates (A, B) via geometric analysis. Such computation may involve equations that take into account the four regions I, II, III, and IV of the position-detecting surface 350 along with several parameters (e.g., 'L', 'W', 'n', 'm'), as discussed herein.

As previously mentioned, according to the exemplary embodiment with reference to FIG. 4, when the object M is positioned on the position-detecting surface 350 of the optical touch panel 301, the object M blocks two light beams, thereby hindering the two light beams from reaching two light-receiving elements positioned opposite to the light-emitting elements. The two light-receiving elements that do not receive the light beams may be located at two points that respectively may be a distance 'm' and 'n' away from the left edge (i.e., point 0) of the second side 330 of the rectangular position-detecting surface 350. Accordingly, one of the two light-receiving elements not receiving a light beam may be "at a left portion" of the second side 330 and accordingly may be positioned at the point that is 'm' away from the left edge, while the other of the two light-receiving elements not receiving a light beam may be "at a right portion" of the second side 330 and accordingly may be positioned at the point that is 'n' away from the left edge. As described and illustrated herein, the two parameters 'm' and 'n' may be factored into the equations used to compute the X/Y rectangular coordinates (A, B) of the object M.

Moreover, the length 'L' and the width 'W' of the position-detecting surface 350 may be given. 'L' and 'W' may be two additional parameters factored into the equations used to compute the X/Y rectangular coordinates (A, B) of the object M.

In short, as previously discussed and illustrated in FIG. 4, there may be two light-receiving elements that do not receive light beams due to blockage by the object M, and these two light-receiving elements may be located at two points that are respectively a distance 'm' and 'n' away from the left edge of the second side 330 of the position-detecting surface 350 with length 'L' and width 'W'. Taking into account the parameters (L, W, m, n) and the four regions I, II, III, and IV of the position-detecting surface 350, the control circuit may be configured to compute via geometric analysis the X/Y rect-angular coordinates (A, B) of the object M. Such computation may be carried out through the use of four equations, wherein the equation used in a given case depends on which of the four regions the object M is located. The X/Y rectangular coordinates (A, B) may be computed via the following:

If the two light-receiving elements that do not receive a light beam during a scan cycle are both first light-receiving elements (330a), then the object M is positioned within the region I of the position-detecting surface 350. The equation to determine the X/Y rectangular coordinates (A, B) when the object M is positioned within the region I is the following:

$$(A, B) = \left(\left|\frac{n-m}{2}\right|, W - \frac{n+m}{2}\right)$$

For example, as shown in FIG. 4, consider the scenario in which the two light-receiving elements that do not receive a light beam are both first light-receiving elements (330a). In such case, the object M is positioned within the region I. Moreover, the distances of the two light-receiving elements from the left edge of the second side 330 of the position-detecting surface 350 are respectively m=8 (referring to the light-receiving element at a left portion of the second side 330) and n=14 (referring to the light-receiving element at a right portion of the second side 330). Furthermore, according to FIG. 4, L=23 and W=19. Thus, (L, W, m, n)=(23, 19, 8, 14), and accordingly (A, B)=(3, 8).

If the two light-receiving elements that do not receive a light beam during a scan cycle are both second light-receiving elements (330b), then the object M is positioned within the region II of the position-detecting surface 350. The equation to determine the X/Y rectangular coordinates (A, B) when the object M is positioned within the region II is the following:

$$(A, B) = \left(L - \left|\frac{n-m}{2}\right|, (W-L) + \frac{n+m}{2}\right)$$

For example, if (L, W, m, n)=(23, 19, 6, 16), and if the object M is positioned within the region II, then (A, B)=(18, 7).

If the light-receiving element at a left portion of the second side 330 of the position-detecting surface 350 that does not receive a light beam during a scan cycle is a first light-receiving element (330a), and the light-receiving element at a right portion of the second side 330 of the position-detecting surface 350 that does not receive a light beam is a second light-receiving element (330b), then the object M is positioned within the region III of the position-detecting surface 350. The equation to determine the X/Y rectangular coordinates (A, B) when the object M is positioned within the region III is the following:

$$(A, B) = \left(L - \frac{n+m}{2}, (W-L) + \left|\frac{n-m}{2}\right|\right)$$

For example, if (L, W, m, n)=(23, 19, 2, 16), and if the object M is positioned within the region III, then (A, B)=(14, 3).

If the light-receiving element at a left portion of the second side 330 of the position-detecting surface 350 that does not receive a light beam during a scan cycle is a second light-receiving element (330b), and the light-receiving element at a right portion of the second side 330 of the position-detecting surface 350 that does not receive a light beam is a first light-receiving element (330a), then the object M is positioned within the region IV of the position-detecting surface 350. The equation to determine the X/Y rectangular coordinates (A, B) when the object M is positioned within the region IV is the following:

$$(A, B) = \left(\frac{n+m}{2}, W - \left|\frac{n-m}{2}\right|\right)$$

For example, if (L, W, m, n)=(23, 19, 8, 14), and if the object M is positioned within the region IV, then (A, B)=(11, 16).

Figure 2:
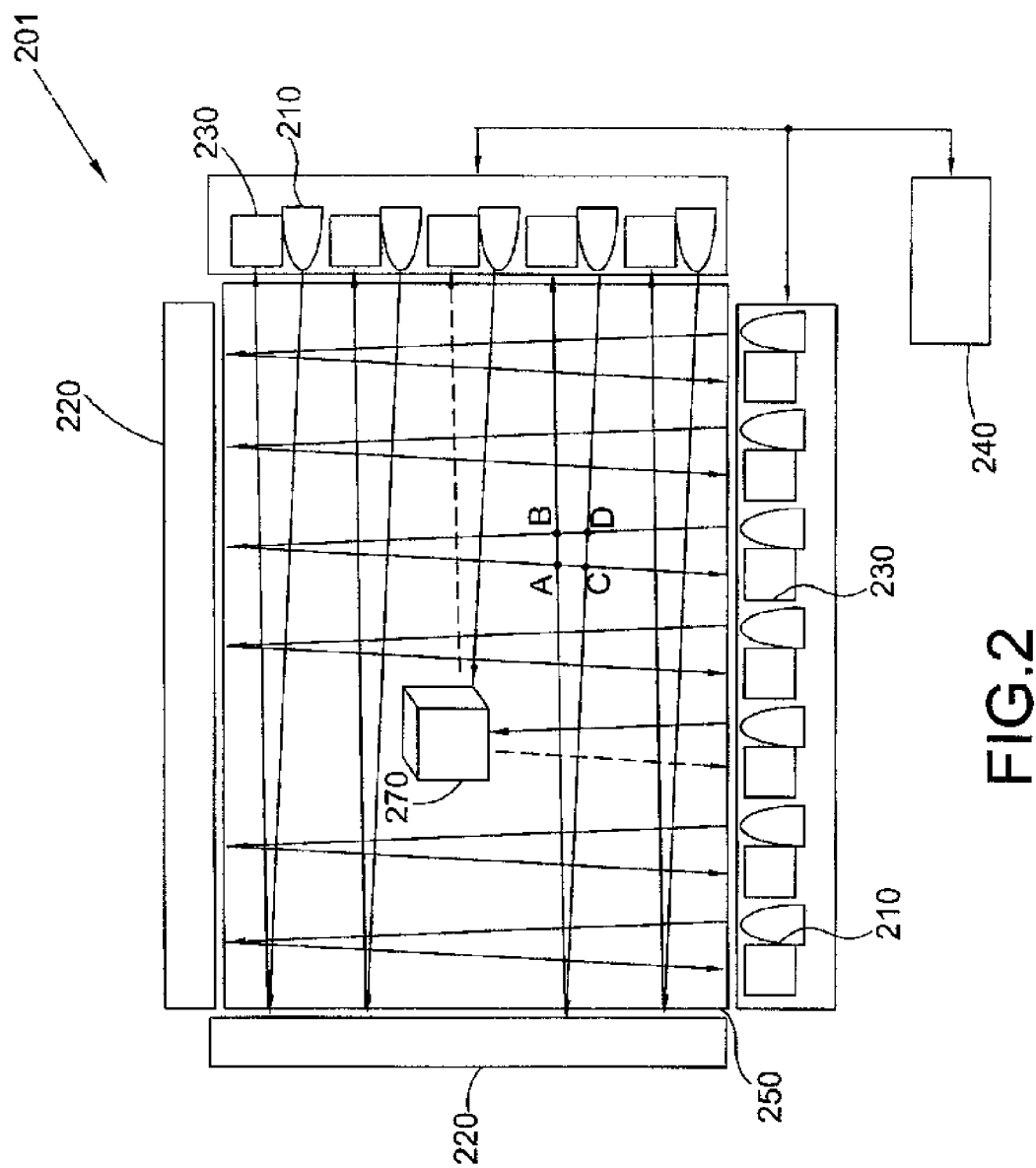
FIG. 2 is a block diagram depicting the construction of another conventional optical touch panel according to the prior art.

The X/Y rectangular coordinates (A, B) of the object M may be determined uniquely via the computing mentioned above. Accordingly, the disclosed exemplary embodiment overcomes the problem of four positions (e.g., A, B, C, D) having the same X/Y coordinates as discussed herein with respect to the conventional art and illustrated in FIG. 2. Accordingly, the resolution of the optical touch panel 301 may be increased.

In addition, as the light-emitting element pairs (310a, 310b) may be arranged merely along the first side 310 of the position-detecting surface 350 in the lengthwise direction (as opposed to along multiple sides), and the light-receiving element pairs (330a, 330b) may be arranged merely along the second side 330 opposite to the first side 330 of position-detecting surface 350 in the lengthwise direction (as opposed to along multiple sides), sunlight will not affect determination of the precise rectangular coordinates of the object M positioned on the position-detecting surface 350. Accordingly, the light gate design for each light-receiving element may be saved.

Various modifications and rearrangements may be made to the various embodiments without departing from the scope of the disclosure. For example, the angle θ need not be 45 degrees as illustrated in FIGS. 3 and 4. For example, according to various embodiments, the angle θ may be any angle between 0 and 180 degrees. In the event that the angle θ is not 45 degrees, the coordinates of the object M will not be rectangular. Nevertheless, the coordinates may be converted into X/Y rectangular coordinates using a conventional coordinate transformation procedure. Thus, those skilled in the art will appreciate that using a different value for angle θ is possible without materially departing from the novel teachings and advantages of the various embodiments.

The illustration of the various embodiments herein with reference to the drawings is provided for a better understanding of the characteristics and spirit of these embodiments. It will be understood that the various embodiments are not limited to the particular exemplary embodiment described herein but rather are capable of various modifications and rearrangements without departing from their scope. Therefore, it is intended that the following claims, accompanied by detailed descriptions giving the broadest explanation, not only define the scope of the various embodiments but also cover all such modifications and changes as fall within their true spirit and scope.

The invention claimed is:

1. An optical touch panel, comprising:
   a rectangular position-detecting surface with a specified length and a specified width;
   a plurality of light-emitting element pairs configured for emitting a plurality of light beams, wherein:
   the plurality of light-emitting element pairs are arranged in pair at various points along a first side of the position-detecting surface in a lengthwise direction,
   a first light-emitting element is arranged at the left side of each light-emitting element pair at an angle 180−θ with reference to the first side of the position-detecting surface in the lengthwise direction, and
   a second light-emitting element is arranged at the right side of each light-emitting element pair at an angle θ with reference to the first side of the position-detecting surface in the lengthwise direction;
   a plurality of light-receiving element pairs configured for receiving the plurality of light beams emitted by the plurality of light-emitting element pairs, wherein:
   the plurality of light-receiving element pairs are arranged in pair at various points along a second side of the position-detecting surface opposite to the first side in the lengthwise direction,
   a first light-receiving element is arranged at the left side of each light-receiving element pair at an angle θ−180 with reference to the second side of the position-detecting surface in the lengthwise direction, and
   a second light-receiving element is arranged at the right side of each light-receiving element pair at an angle −θ with reference to the second side of the position-detecting surface in the lengthwise direction;
   a first reflector arranged along a first side of the position-detecting surface in a widthwise direction, wherein the first reflector is configured for reflecting a light beam emitted by one of the first light-emitting elements to one of the first light-receiving elements;
   a second reflector arranged along a second side of the position-detecting surface in the widthwise direction, wherein the second reflector is configured for reflecting a light beam emitted by one of the second light-emitting elements to one of the second light-receiving elements; and
   a control circuit configured for causing the plurality of light-emitting element pairs to emit the plurality of light beams in a predetermined order to scan the position-detecting surface, and further configured for causing the plurality of light-receiving element pairs to receive the plurality of light beams, thereby forming optical paths on the position-detecting surface in a grid pattern;
   wherein the angle θ is greater than 0 degrees and less than 180 degrees, wherein the optical touch panel is adapted for detecting an object positioned on the position-detecting surface, and wherein at least a portion of the plurality of light beams are blocked by the object when the object is positioned on the position-detecting surface, thereby hindering the portion of the plurality of light beams from reaching at least one of the first or second light-receiving elements of at least one of the plurality of light-receiving element pairs.

2. The optical touch panel according to claim 1, wherein the control circuit is further configured for determining coordinates of the object positioned on the position-detecting surface.

3. The optical touch panel according to claim 1, wherein:
   the control circuit is further configured for dividing the position-detecting surface into four regions I, II, III, and IV, which are based on whether each of two light-receiving elements not receiving a light beam is a first light-receiving element or a second light-receiving element of one of the plurality of light-receiving element pairs; and the control circuit is further configured for computing coordinates of the object positioned on the position-detecting surface via the following:

if the two light-receiving elements not receiving a light beam during a scan cycle are both first light-receiving elements, then the object is positioned within the region I of the position-detecting surface, and the equation to determine the coordinates is the following:

$$(A, B) = \left(\left|\frac{n-m}{2}\right|, W - \frac{n+m}{2}\right);$$

if the two light-receiving elements not receiving a light beam during a scan cycle are both second light-receiving elements, then the object is positioned within the region II of the position-detecting surface, and the equation to determine the coordinates is the following:

$$(A, B) = \left(L - \left|\frac{n-m}{2}\right|, (W - L) + \frac{n+m}{2}\right);$$

if the light-receiving element at a left portion of the second side of the position-detecting surface in the lengthwise direction not receiving a light beam during a scan cycle is a first light-receiving element, and the light-receiving element at a right portion of the second side of the position-detecting surface in the lengthwise direction not receiving a light beam is a second light-receiving element, then the object is positioned within the region III of the position-detecting surface, and the equation to determine the coordinates is the following:

$$(A, B) = \left(L - \frac{n+m}{2}, (W - L) + \left|\frac{n-m}{2}\right|\right);$$

and if the light-receiving element at a left portion of the second side of the position-detecting surface in the lengthwise direction not receiving a light beam during a scan cycle is a second light-receiving element, and the light-receiving element at a right portion of the second side of the position-detecting surface in the lengthwise direction not receiving a light beam is a first light-receiving element, then the object is positioned within the region IV of the position-detecting surface, and the equation to determine the coordinates is the following:

$$(A, B) = \left(\frac{n+m}{2}, W - \left|\frac{n-m}{2}\right|\right);$$

wherein '(A, B)' corresponds to the coordinates of the object and 'm' and 'n' respectively correspond to distances of the two light-receiving elements not receiving a light beam from a left edge of the second side of the position-detecting surface in the lengthwise direction, wherein 'L' is the specified length of the position-detecting surface, and wherein 'W' is the specified width of the position-detecting surface.

4. The optical touch panel according to claim 1, wherein if more than two of the plurality of light beams are blocked by the object, coordinates of an intended center position of the object are determined by averaging detected coordinate information.

5. The optical touch panel according to claim 1, wherein the angle θ is greater than an angle β, and wherein the angle β is an angle of a diagonal line of the position-detecting surface with reference to the first side of the position-detecting surface in the lengthwise direction and is defined by the specified length of the position-detecting surface and the specified width of the position-detecting surface.

6. The optical touch panel according to claim 1, wherein:
the angle θ is 45 degrees;
the angle between the first light-emitting element and the second light-emitting element of each light-emitting element pair is 90 degrees; and
the angle between the first light-receiving element and the second light-receiving element of each light-receiving element pair is 90 degrees.

7. The optical touch panel according to claim 1, wherein the control circuit is further configured to cause the light-emitting element pairs to emit the plurality of light beams one-by-one in a sequential order from left to right, or to cause a plurality of alternate light-emitting element pairs to emit the plurality of light beams at a given time.

8. The optical touch panel according to claim 1, wherein the plurality of light-emitting element pairs comprise light emitting diodes.

9. The optical touch panel according to claim 1, wherein the plurality of light-receiving element pairs comprise photo transistors.

10. An optical touch panel, comprising:
a rectangular position-detecting surface with a specified length and a specified width;
a plurality of light-emitting element pairs configured for emitting a plurality of light beams, wherein:
the plurality of light-emitting element pairs are arranged in pair at various points along a first side of the position-detecting surface in a lengthwise direction,
a first light-emitting element is arranged at the left side of each light-emitting element pair at an angle 180−θ with reference to the first side, and
a second light-emitting element is arranged at the right side of each light-emitting element pair at an angle θ with reference to the first side;
two reflectors arranged along two opposing sides of the position-detecting surface in a widthwise direction, wherein the reflectors are configured for reflecting the plurality of light beams emitted by the plurality of light-emitting element pairs;
a plurality of light-receiving element pairs configured for receiving the plurality of light beams emitted by the plurality of light-emitting element pairs, wherein:
the plurality of light-receiving element pairs are arranged in pair at various points along a second side of the position-detecting surface opposite to the first side in the lengthwise direction,
a first light-receiving element is arranged at the left side of each light-receiving element pair at an angle θ−180 with reference to the second side, and
a second light-receiving element is arranged at the right side of each light-receiving element pair at an angle −θ with reference to the second side; and
a control circuit configured for causing the plurality of light-emitting element pairs to emit the plurality of light beams in a predetermined order to scan the position-detecting surface, and for causing the plurality of light-receiving element pairs to receive the plurality of light beams, thereby forming optical paths on the position-detecting surface in a grid pattern;

wherein:

the angle $\theta$ is greater than 0 degrees and less than 180 degrees;

the optical touch panel is adapted for detecting an object positioned on the position-detecting surface;

at least a portion of the plurality of light beams are blocked by the object when the object is positioned on the position-detecting surface, thereby hindering the portion of the plurality of light beams from reaching at least one of the first or second light-receiving elements of at least one of the plurality of light-receiving element pairs;

the control circuit is further configured for dividing the position-detecting surface into four regions I, II, III, and IV, which are based on whether each of two light-receiving elements not receiving a light beam is a first light-receiving element or a second light-receiving element of one of the plurality of light-receiving element pairs; and the control circuit is further configured for computing coordinates of the object positioned on the position-detecting surface via the following:

if the two light-receiving elements not receiving a light beam during a scan cycle are both first light-receiving elements, then the object is positioned within the region I of the position-detecting surface, and the equation to determine the coordinates is the following:

$$(A, B) = \left(\left|\frac{n-m}{2}\right|, W - \frac{n+m}{2}\right);$$

if the two light-receiving elements not receiving a light beam during a scan cycle are both second light-receiving elements, then the object is positioned within the region II of the position-detecting surface, and the equation to determine the coordinates is the following:

$$(A, B) = \left(L - \left|\frac{n-m}{2}\right|, (W-L) + \frac{n+m}{2}\right);$$

if the light-receiving element at a left portion of the second side of the position-detecting surface not receiving a light beam during a scan cycle is a first light-receiving element, and the light-receiving element at a right portion of the second side of the position-detecting surface not receiving a light beam is a second light-receiving element, then the object is positioned within the region III of the position-detecting surface, and the equation to determine the coordinates is the following:

$$(A, B) = \left(L - \frac{n+m}{2}, (W-L) + \left|\frac{n-m}{2}\right|\right);$$

and if the light-receiving element at a left portion of the second side of the position-detecting surface not receiving a light beam during a scan cycle is a second light-receiving element, and the light-receiving element at a right portion of the second side of the position-detecting surface not receiving a light beam is a first light-receiving element, then the object is positioned within the region IV of the position-detecting surface, and the equation to determine the coordinates is the following:

$$(A, B) = \left(\frac{n+m}{2}, W - \left|\frac{n-m}{2}\right|\right);$$

wherein '(A, B)' corresponds to the coordinates of the object and 'm' and 'n' respectively correspond to distances of the two light-receiving elements not receiving a light beam from a left edge of the second side of the position-detecting surface, wherein 'L' is the specified length of the position-detecting surface, and wherein 'W' is the specified width of the position-detecting surface.

11. The optical touch panel according to claim 10, wherein if more than two of the plurality of light beams are blocked by the object, coordinates of an intended center position of the object are determined by averaging detected coordinate information.

12. The optical touch panel according to claim 10, wherein the angle $\theta$ is greater than an angle $\beta$, and wherein the angle $\beta$ is an angle of a diagonal line of the position-detecting surface with reference to the first side of the position-detecting surface and is defined by the specified length of the position-detecting surface and the specified width of the position-detecting surface.

13. The optical touch panel according to claim 10, wherein:
the angle $\theta$ is 45 degrees;
the angle between the first light-emitting element and the second light-emitting element of each light-emitting element pair is 90 degrees; and
the angle between the first light-receiving element and the second light-receiving element of each light-receiving element pair is 90 degrees.

14. The optical touch panel according to claim 10, wherein the control circuit is further configured to cause the light-emitting element pairs to emit the plurality of light beams one-by-one in a sequential order from left to right, or to cause a plurality of alternate light-emitting element pairs to emit the plurality of light beams at a given time.

15. The optical touch panel according to claim 10, wherein the plurality of light-emitting element pairs comprise light emitting diodes.

16. The optical touch panel according to claim 10, wherein the plurality of light-receiving element pairs comprise photo transistors.

* * * * *